US006282600B1

(12) United States Patent
Maule et al.

(10) Patent No.: US 6,282,600 B1
(45) Date of Patent: *Aug. 28, 2001

(54) METHOD AND APPARATUS OF RESOLVING CONFLICTING REGISTER ACCESS REQUESTS FROM A SERVICE PROCESSOR AND SYSTEM PROCESSOR

(75) Inventors: Warren Edward Maule, Cedar Park; Roy Stuart Moore, Pflugerville; David W. Victor, Round Rock; Edward Hugh Welbon, Austin, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,338

(22) Filed: Aug. 14, 1998

(51) Int. Cl.[7] .............................. G06F 13/14; H04B 1/74
(52) U.S. Cl. ............................................... 710/244; 714/31
(58) Field of Search ..................... 710/107–125, 710/240–244, 36–51; 714/30–31, 724–745

(56) References Cited

U.S. PATENT DOCUMENTS

| | | | |
|---|---|---|---|
| 4,268,902 | * | 5/1981 | Berglund et al. ..................... 710/129 |
| 4,924,380 | * | 5/1990 | McKinney et al. ................... 710/111 |
| 4,942,522 | * | 7/1990 | Wilkie et al. ........................ 713/502 |
| 5,056,007 | * | 10/1991 | Collins, Jr. et al. ................. 710/119 |
| 5,159,263 | * | 10/1992 | Yaguchi ............................... 324/537 |
| 5,410,551 | | 4/1995 | Edwards et al. ..................... 714/736 |
| 5,497,456 | * | 3/1996 | Alexander et al. ..................... 714/29 |
| 5,519,715 | | 5/1996 | Hao et al. ............................ 714/727 |
| 5,590,354 | * | 12/1996 | Klapproth et al. ..................... 714/30 |
| 5,598,421 | * | 1/1997 | Tran et al. ........................... 714/726 |
| 5,649,090 | | 7/1997 | Edwards et al. ...................... 714/10 |
| 5,724,505 | * | 3/1998 | Argade et al. ........................ 714/45 |
| 5,740,350 | | 4/1998 | Rabins et al. ......................... 714/10 |
| 5,828,827 | * | 10/1998 | Mateja et al. .......................... 714/30 |
| 5,907,689 | * | 5/1999 | Tavallaei et al. ..................... 710/110 |
| 5,931,938 | * | 8/1999 | Drogichen et al. . |
| 6,055,656 | * | 4/2000 | Wilson, Jr. et al. ................. 714/724 |

OTHER PUBLICATIONS

Andrew S. Tanenbaum, Structured Computer Organization, Third Edition, 1990, pp. 11–13.*

* cited by examiner

Primary Examiner—Sumati Lefkowitz
(74) Attorney, Agent, or Firm—Robert V. Wilder; Leslie A. Van Leeuwen

(57) ABSTRACT

A method and implementing system are provided in which a service processor is implemented in addition to system processors. The service processor is enabled to access system on-chip registers to acquire system data through the use of the system JTAG bus connections. In one embodiment, logic is provided to determine concurrent calls for use of the same registers by both the system processor(s) and also by the service processor through the JTAG bus. In case of concurrent requests, the JTAG data are held so as not to interfere with system operations until the system processor's use of the registers has been completed.

18 Claims, 5 Drawing Sheets

METHOD AND APPARATUS OF RESOLVING CONFLICTING REGISTER ACCESS REQUESTS FROM A SERVICE PROCESSOR AND SYSTEM PROCESSOR

FIELD OF THE INVENTION

The present invention relates generally to information processing systems and more particularly to a method and apparatus for acquiring and managing system data through a system JTAG port.

BACKGROUND OF THE INVENTION

Most current computer system designs utilize the concept of a service processor. The service processor is typically used to handle various "power-on" type functions, such as test, scan utilization, starting clocks, etc. Once the computer is "booted up" and begins to run, there are usually control or status registers that the system needs to set or interrogate. Also, as the topology of systems becomes more distributed, it becomes critical to access certain instrumented performance facilities or internal workload traces in order to maintain workload balancing across the entire system or to gather sequential snapshots of machines' states in real time. It is also critical that the accessing and usage of this performance monitoring data be non-invasive to normal workload processing.

Accordingly, there is a need for an enhanced method and apparatus which is effective to provide a service processor with access to a number of registers internal to a chip while system clocks are running and without imposing any restriction that the registers be connected in a unique scan string or common clock boundary.

SUMMARY OF THE INVENTION

A method and apparatus is provided by which a service processor is enabled to access system and chip registers to acquire system data through the use of the system JTAG bus. In one embodiment, logic is provided to determine concurrent calls for use of the same registers by both the system CPUs and also by the service processor through the JTAG bus, in which case the JTAG data are held so as not to interfere with system operations until the system's use of the register has been completed.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
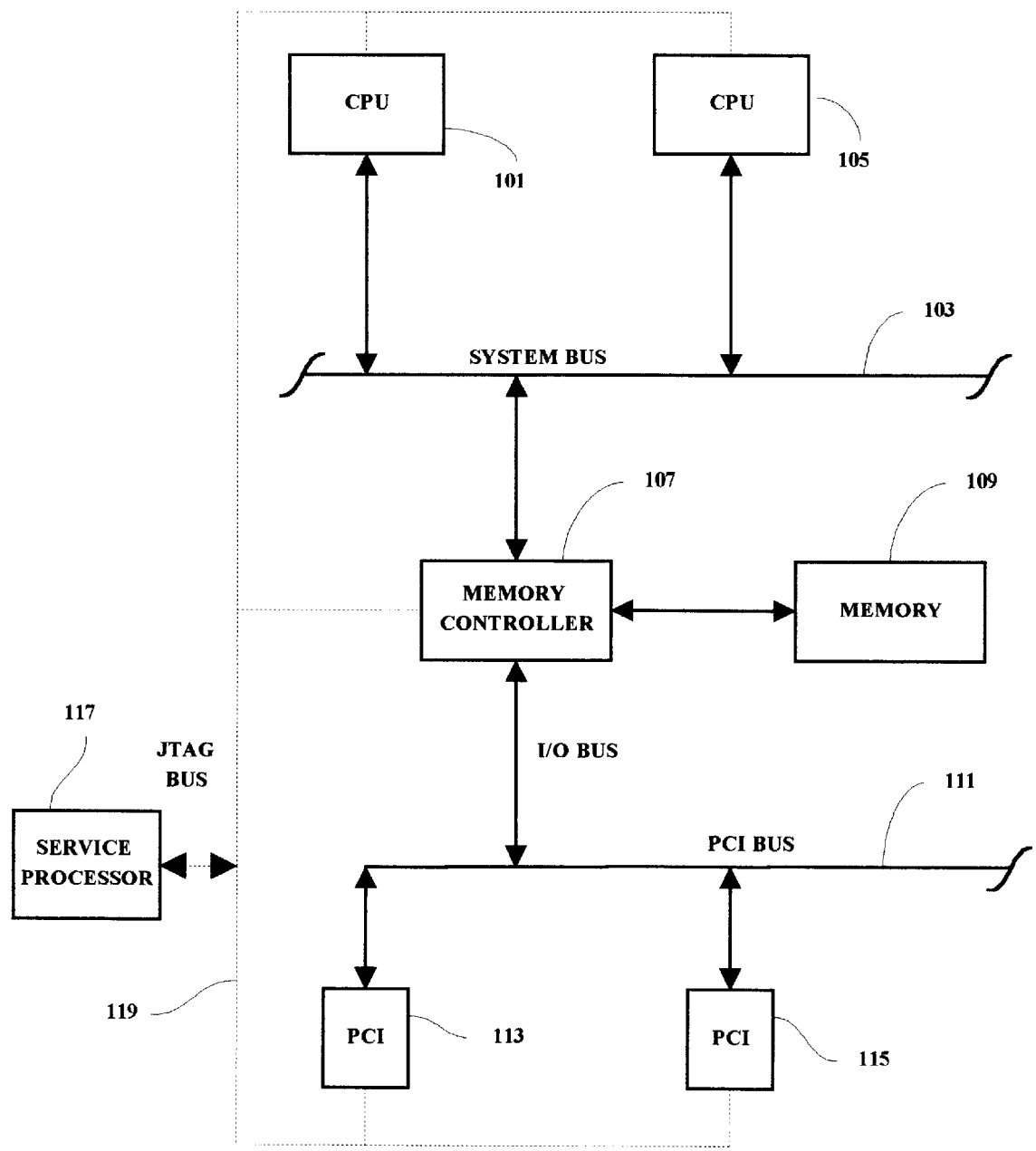
FIG. 1 is a schematic block diagram of a portion of a computer system which includes a service processor and a JTAG bus arrangement.

With reference to FIG. 1, the various methods discussed herein may be implemented within a typical computer system or workstation. In the drawings, like numerals refer to like parts. An exemplary hardware configuration of a workstation which may be used in conjunction with the present invention is illustrated and may include one or more CPUs (central processing units) such as CPU 101 and CPU 105. The CPUs are connected to a system bus 103, which, in turn, is connected to a memory controller 107. The memory controller 107 is coupled to a system memory 109, and also to a PCI (peripheral component interconnect) bus 111. The PCI bus 111 is arranged to have PCI devices such as devices 113 and 115 connected thereto.

Also shown in FIG. 1 is a service processor 117 which is connected via a JTAG (Joint Test Action Group) bus 119 to the various components or chips in the illustrated exemplary embodiment including the CPU 101, CPU 105, memory controller 107, and PCI devices 113 and 115. The implementation illustrated allows access to a limited set of on-chip registers via a service processor 117 scannable interface while the system clocks continue to run. There is no restriction on having these accessible registers connected in the same "scan string" or even in the same clock boundary. The exemplary embodiment includes a two chip memory controller 107. Each chip contains configuration, error status and other instrumented facilities that are accessible by the service processor 117. The service processor 117 analyzes the gathered data and can interrupt the system for a specified desired action upon the occurrence of a predetermined set of data. The service processor 117 passes commands and data serially to the chipset through the JTAG interface or bus 119.

In the example, a JTAG controller 201 (shown in FIG. 2) which is located internal to each system component connected to the service processor, decodes JTAG commands from the service processor 117, and also buffer data that is sent from the service processor 117, or data that is to be sent to the service processor 117. The JTAG commands pertinent to the present example are DS_WRITE (dynamic scan write), and DS_READ (dynamic scan read) commands. These commands allow the chipset to update and/or access certain on-chip registers while the system is running over the JTAG service processor port 119.

Figure 2:
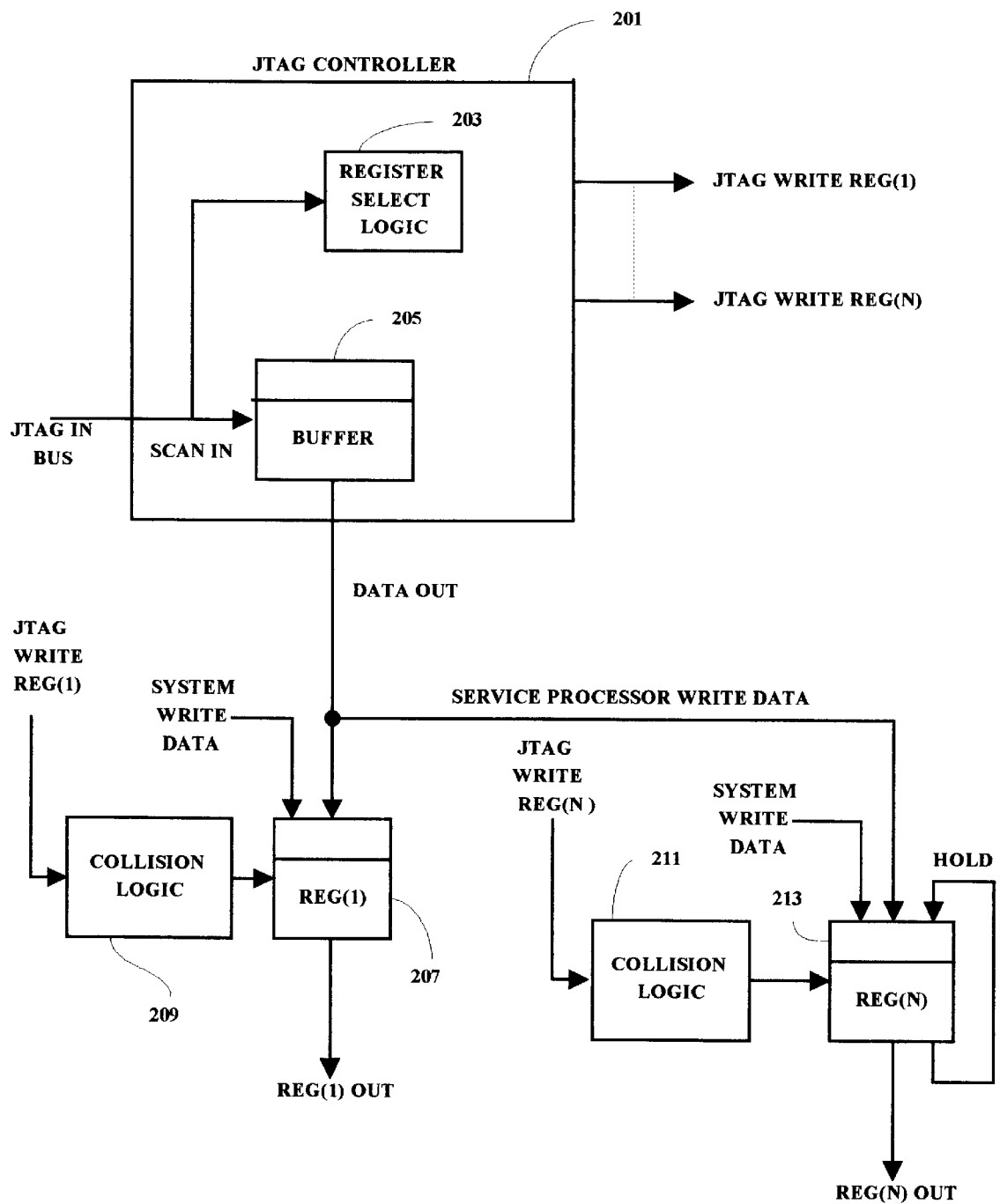
FIG. 2 shows a high level diagram for service processor "writes" to system registers.

As shown in FIG. 2, the JTAG controller 201, which includes a register select logic circuit 203 and a buffer circuit 205, provides "JTAG write" signals for the various accessible registers i.e. register "1" through register "N". As illustrated, buffer 205 provides "service processor write data" to the accessible registers Reg(1) 207 through Reg(N) 213. The accessible registers Reg(1) through Reg(N) also receive "system write" data input. The JTAG WRITE signals are applied to collision logic circuits 209 and 211 associated with the registers Reg(1) 207 through Reg(N) 213, respectively. Registers Reg(1) 207 through Reg(N) 213 are arranged to provide output signals REG(1) OUT and REG(N) OUT, respectively.

With regard to service processor "writes" to system registers, as shown in FIG. 2, the JTAG controller 201 first receives a DS_WRITE OP CODE from the service processor 117. Next, an on-chip register address field is passed. In the present example, a five bit address is used although a larger field could be used depending on the needs of a specific implementation. Next a 32-bit data field is scanned-in and stored in the buffer 205. Once the data is buffered, the address is converted into one of "N" write pulses by the register select logic circuit 203. The pulses are synched-up to the system clock that is connected to Reg(1)–Reg(N). The contents of the data buffer are then copied to the on-chip registers addressed if the system is not currently updating the contents of that register. If, during the cycle of the Write Reg(N) pulse, the system is trying to update register N, then a collision logic circuit 209 allows the system update register path to have priority and the JTAG buffer copy is delayed. The collision logic is shown in more detail in connection with FIG. 5 and FIG. 6.

Figure 3:
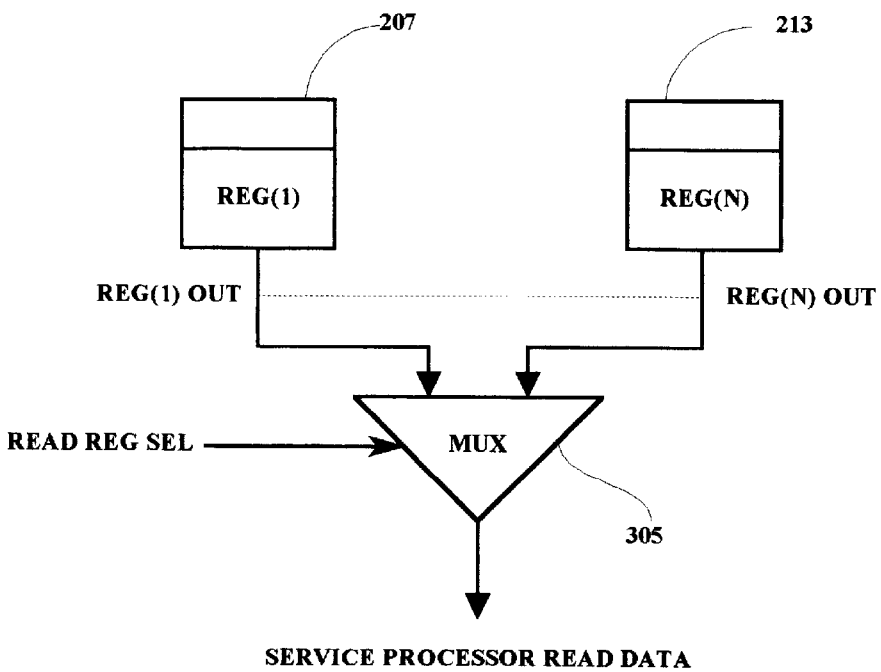
FIG. 3 shows a partial schematic diagram for service processor "reads" from system registers.
Figure 4:
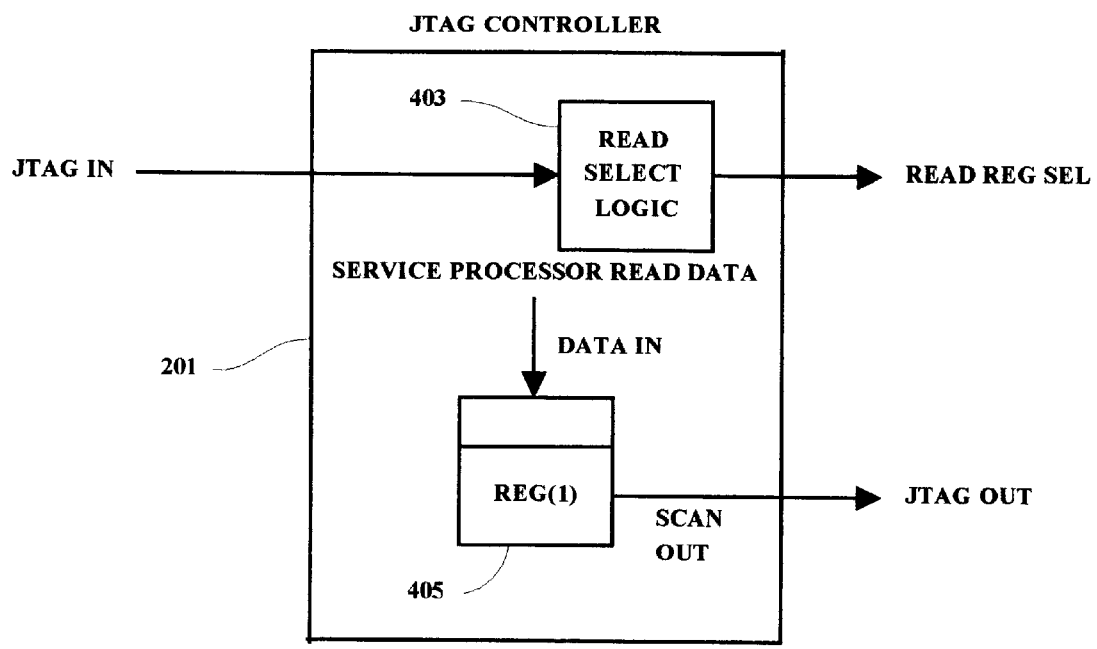
FIG. 4 shows another partial schematic diagram for service processor "reads" from system registers.

In FIG. 3, output signals from the registers Reg(1) 207 through Reg(N) 213 are applied to the input of a MUX 305. The MUX circuit 305 is controlled by a READ REG SEL signal and provides an output Service Processor Read Data signal. As shown in FIG. 4, the Service Processor Read Data signal is applied as data input to Reg(1) 405, which in turn provides the SCAN OUT output signal JTAG OUT in the read mode to the service processor. The JTAG controller 201 also includes read select logic circuit 403 which receives a JTAG IN input signal and provides a READ REG SEL output signal, which, in turn is applied to control the MUX 305 shown in FIG. 3.

In a read operation, data is read from system registers back to the service processor 117. The service processor 117 first issues a DS_READ command across the JTAG bus 119 along with the address of the data to be read. The address is translated by the JTAG controller Read Select Logic circuit 403 into the Read Register Select lines that control the MUX 305 as shown. The data from one of the registers Reg(1) through Reg(N) is selected and loaded into the JTAG controller Data Buffer 405. The contents of that buffer are then scanned out across the JTAG OUT serial interface to the service processor 117.

In the illustrated example, only minimal hardware has been implemented for the functions provided. Two special command OP codes were architected into the service processor interface. One of the OP codes is used to effect the dynamic scan write function and the other OP code is used to effect the dynamic scan read function. A single data buffer is used to hold transfer data for scan-in and scan-out operations to and from the service processor. Each register that it is desired to write in this manner by the service processor 117 must contain an extra write port and a small amount of collision detect logic to assure that the system is not updating a register during a dynamic scan by the service processor. For service processor "reads", a MUX function to select one of "N" registers is required. The accessible registers do not have to be in the same scan string or even on the same clock boundary in the chip.

Figure 5:
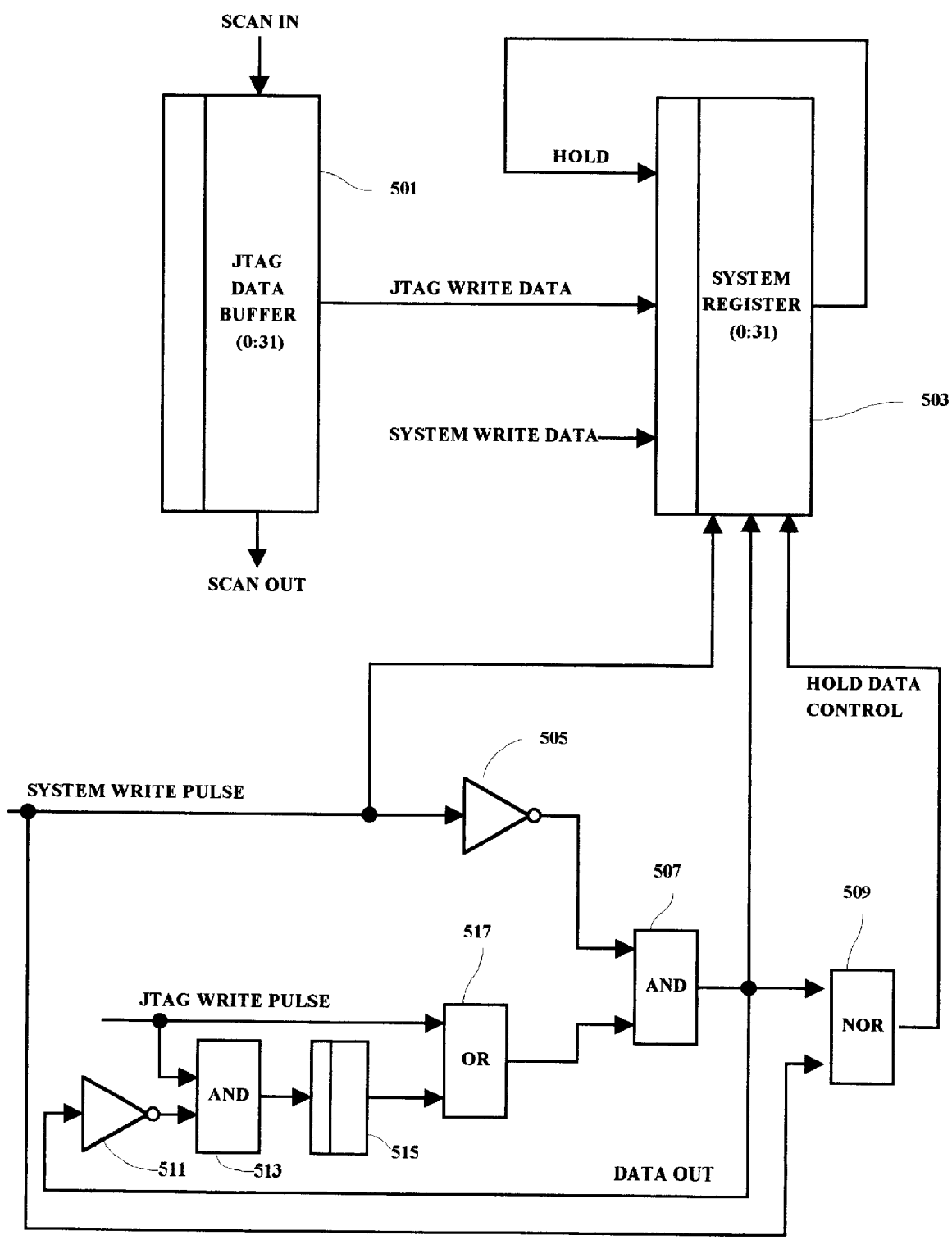
FIG. 5 is a schematic diagram illustrating an exemplary "write" collision protection logic circuit.

One exemplary embodiment of a collision detect logic circuit, such as logic circuits 209 and 211, is shown in FIG. 5. The JTAG data buffer circuit 501 receives a SCAN IN signal and provides a SCAN OUT signal. A JTAG WRITE DATA signal output from the JTAG data buffer 501 is applied to the system register 503 which also receives an input SYSTEM WRITE DATA input. As hereinbefore noted, when the JTAG WRITE DATA signal occurs at the same time as the SYSTEM WRITE DATA signal, the SYSTEM WRITE DATA will have priority and the system register 503 will hold the JTAG WRITE DATA until there is no timing conflict between occurrences of the JTAG WRITE DATA and the SYSTEM WRITE DATA functions.

As shown in FIG. 5, inverter 505 receives an input SYSTEM WRITE PULSE and provides an output which is applied as one input to a two input AND gate 507. A JTAG WRITE PULSE is applied to one input of a two input OR gate 517, the output of which is connected to the other input of the AND gate 507. The output of the AND gate 507 is connected to one input of a two input NOR gate 509 and also to an input of an inverter circuit 511. The output of the inverter 511 is connected to one input of a two input AND gate 513, the other input of which receives the JTAG WRITE PULSE signal. The output of the AND gate 513 is applied through a register 515 to a second input of the OR gate 517. The second input of the NOR gate 509 receives the SYSTEM WRITE PULSE signal. The output from the NOR gate 509 is applied to the system register 503. The output of the AND gate 507 is also connected to the system register 503 such that when the SYSTEM WRITE PULSE and the JTAG WRITE PULSE occur at the same time, the output of the AND gate 507 is low and the SYSTEM WRITE DATA function takes priority over the JTAG WRITE DATA function in the system register 503. When both JTAG write and system write functions are called for concurrently, the NOR gate will effect a JTAG data hold function in the system register 503 until the system write function has completed.

Figure 6:
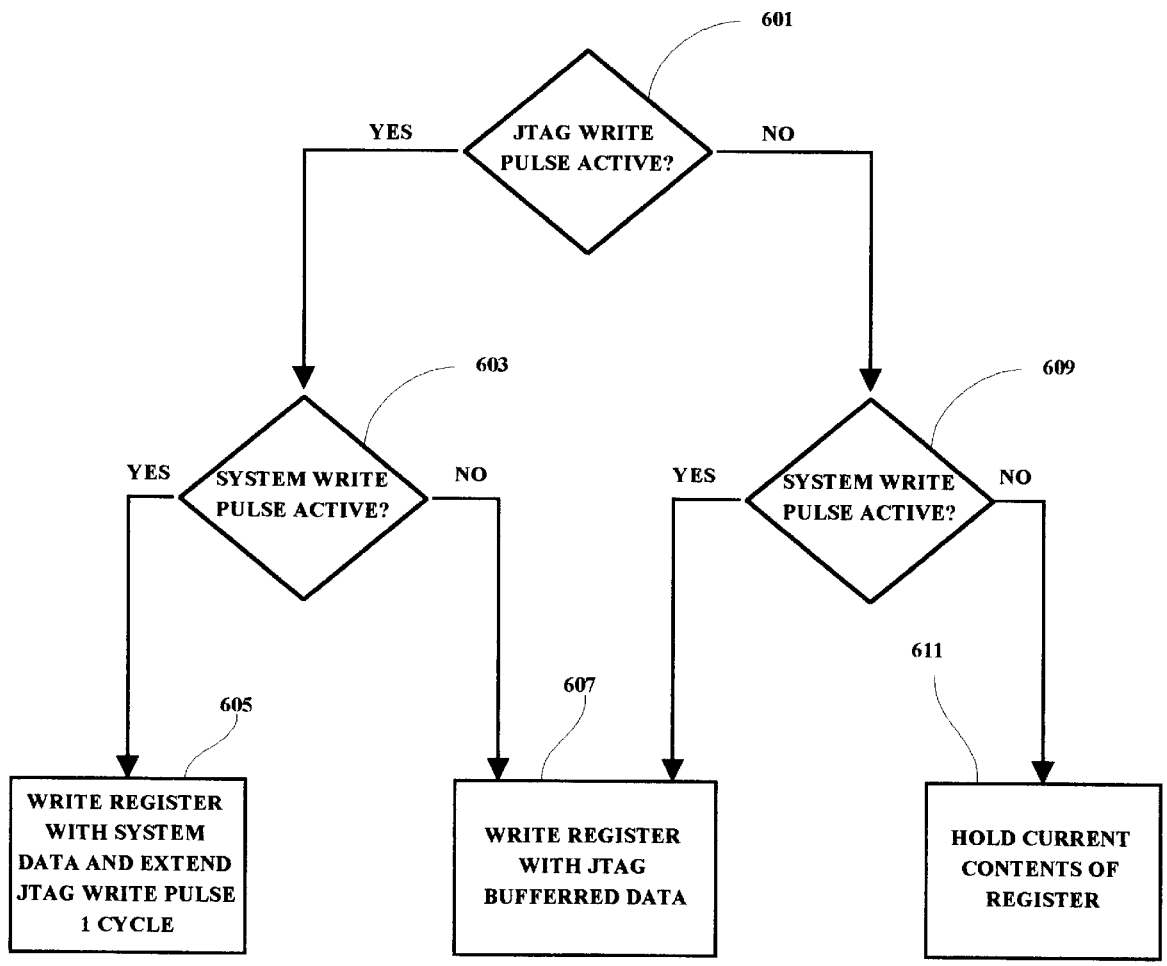
FIG. 6 is a diagram of an operational flow for a write collision management methodology implemented in connection with the illustrated example.

As shown in FIG. 6, when the JTAG WRITE PULSE is active 601, and the SYSTEM WRITE PULSE is active 603, the system register is written 605 with system data and the JTAG WRITE PULSE is extended for one cycle. When the JTAG WRITE PULSE is active 601 and the SYSTEM WRITE PULSE is inactive 603, or when the JTAG WRITE PULSE is inactive and the SYSTEM WRITE PULSE is active 609, then in either case, the system register 503 is written with the JTAG buffered data 607. However, when the JTAG WRITE PULSE is not active 601 and the SYSTEM WRITE PULSE is also inactive 609, then the current contents of the system register 503 are maintained 611.

The exemplary embodiment is also effective for fulfilling non-invasive data gathering needs for many applications and uses and is not intended to be limited to the applications disclosed herein. For example, one potential use would be to use the embodiment in concert with an on-chip trace array. Trace arrays may be used to learn about system internal time "snapshots", i.e. what is going on internal to the chip between given cycles. Such trace arrays begin to capture and cease to capture the snapshot data based upon various triggering events. The service processor could write a given set of registers to serve as a trigger point for the trace data gathering to begin. Once the trigger was hit, an attention signal could be forwarded to the service processor, which could then interrogate the trace array. This could be accomplished without halting the system or causing any disruption to system performance. At the end of a data capture, the captured data may be read by the service processor.

The embodiment could also be used to access blocks of memory during normal system operation. Software could be provided to pin an address range in memory that contains information about system operation, performance data, etc. Periodically, the service processor could scan a command into the read queue of a memory controller which would access the data from memory and hold it in an internal buffer. The service processor could then interrogate the internal buffer's contents and perform desired action. Another usage would be to concurrently access instrumented facilities in each processor of an "N-way" system. That data could then be used to perform a workload balancing function in order to optimize overall system performance.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for accessing CPU registers in an information processing system, said information processing system including at least a first CPU, said first CPU including a set of CPU registers, said method comprising:

establishing a connection between said CPU registers and a service processor; and effecting an arbitration logic within said information processing system, said arbitration logic being responsive to said service processor and said first CPU, said arbitration logic being selectively operable for resolving substantially concurrent CPU register usage requests received from said service processor and a system device within said information processing system, said arbitration logic being operable when substantially concurrent register usage requests are received from said service processor and said system device, for holding said usage request from said service processor until said usage request from said system device has been fulfilled.

2. The method as set forth in claim 1 wherein said arbitration logic is accomplished by means of a software implementation.

3. The method as set forth in claim 1 wherein said arbitration logic is accomplished by means of a logic circuit implementation.

4. The method as set forth in claim 1 wherein said service processor is connected to said set of CPU registers by a service bus separate from a system bus.

5. The method as set forth in claim 1 wherein said connection between said CPU registers and said service processor is accomplished by a JTAG bus separate from a system bus.

6. The method as set forth in claim 1 wherein said CPU register usage requests include read requests.

7. The method as set forth in claim 1 wherein said CPU register usage requests include write requests.

8. The method as set forth in claim 1 wherein said arbitration logic is further operable to effect a holding of said usage requests from said service processor in a buffer device.

9. The method as set forth in claim 8 wherein said information processing system includes a plurality of CPUs, said arbitration logic being operable to effect a holding of said usage requests from said service processor during CPU register usage requests from any of said plurality of CPUs.

10. An access circuit for use in accessing CPU registers within an information processing system, said information processing system including at least a first CPU, said first CPU including said CPU registers, said access circuit comprising:

service processor connection means arranged for connection to a service processor;

a service bus arrangement coupling said CPU registers to said service processor connection means; and a logic circuit coupled to said service processor connection means and said first CPU, said logic circuit being selectively operable for resolving substantially concurrent CPU register usage requests received from said service processor and a system device within said information processing system, said logic circuit being operable when substantially concurrent register usage requests are received from said service processor and said system device, for holding said usage request from said service processor until said usage request from said system device has been fulfilled.

11. The access circuit as set forth in claim 10 and further including logic software, said logic software being selectively executable by said service processor for accomplishing at least a portion of said resolving substantially concurrent CPU register usage requests received from said service processor and said other devices within said information processing system.

12. The access circuit as set forth in claim 10 and further including a service bus connected between said CPU registers and said service processor, said service bus being separate from a system bus.

13. The access circuit as set forth in claim 12 wherein said service bus is a JTAG bus.

14. The access circuit as set forth in claim 10 wherein said CPU register usage requests include read requests.

15. The access circuit as set forth in claim 10 wherein said CPU register usage requests include write requests.

16. The access circuit as set forth in claim 10 wherein said logic circuit is further operable to effect a holding of said usage requests from said service processor in a buffer device.

17. The access circuit as set forth in claim 16 wherein said information processing system includes a plurality of CPUs.

18. A method for acquiring information by accessing CPU registers in an information processing system, said information processing system including at least one CPU, said CPU containing said CPU registers, said method comprising:

establishing a connection between said CPU registers and a service processor; and operating said service processor to effect data transfers between said service processor and said CPU registers on a non-interfering basis with requests for CPU register access by system devices within said information processing system whereby requests from said system devices are fulfilled prior to substantially concurrent requests from said service processor.

* * * * *